United States Patent
Smith (10) Patent No.: US 6,784,623 B2
(45) Date of Patent: Aug. 31, 2004

(54) VARIABLE SWITCH WITH REDUCED NOISE INTERFACE

(75) Inventor: Blaine M. Smith, Portland, OR (US)

(73) Assignee: Tim Simon, Inc., San Francisco, CA (US)

( * ) Notice: Subject to any disclaimer, the term of this patent is extended or adjusted under 35 U.S.C. 154(b) by 0 days.

(21) Appl. No.: 10/285,814

(22) Filed: Nov. 1, 2002

(65) Prior Publication Data

US 2003/0057864 A1 Mar. 27, 2003

Related U.S. Application Data

(62) Division of application No. 09/675,110, filed on Sep. 28, 2000, now Pat. No. 6,501,236.

(51) Int. Cl.[7] .............................................. H05B 37/02
(52) U.S. Cl. .................... 315/224; 315/311; 315/DIG. 4
(58) Field of Search ................................ 315/311, 224, 315/DIG. 4; 362/276, 362

(56) References Cited

U.S. PATENT DOCUMENTS

| | | |
|---|---|---|
| 3,170,084 A | 2/1965 | Retzer |
| 3,265,907 A | 8/1966 | Kurata et al. |
| 3,667,030 A | 5/1972 | Gordon et al. |
| 4,585,986 A | 4/1986 | Dyer |
| 4,719,552 A | 1/1988 | Albach et al. |
| 4,902,958 A | 2/1990 | Cook, II |
| 4,929,871 A | 5/1990 | Gerfast |
| 5,051,667 A | 9/1991 | Dunham |
| 5,175,477 A | 12/1992 | Grissom |
| 5,719,474 A | 2/1998 | Vitello |
| 5,798,619 A | 8/1998 | Covington |
| 6,443,604 B1 * | 9/2002 | Rudenberg .................. 362/488 |

* cited by examiner

*Primary Examiner*—David Vu
(74) *Attorney, Agent, or Firm*—James F. Hann; Haynes Beffel & Wolfeld LLP (57) ABSTRACT

A direct-current dimmer switch with low noise. A direct-current switch is turned on relatively slowly to avoid noise generation. Input capacitance of the direct-current switch device works in conjunction with a switch input series resistor to avoid a sharp turn-on characteristic. A set-point is compared against a voltage ramp to generate a pulse provided to the switch input. Essentially the full voltage is supplied to the load during the pulse. In one embodiment, a field-effect transistor with a low series resistance is used as the direct-current switching device. The ramp is generated by an integrator that is turned off at zero crossings of the alternating input line voltage to re-set the integrator. In a further embodiment a detector, such as a passive infra-red detector, is used to turn on the dimmer switch at a pre-set level.

11 Claims, 10 Drawing Sheets

VARIABLE SWITCH WITH REDUCED NOISE INTERFACE

This application is a Division of application Ser. No. 09/675,110 filed Sep. 28, 2000, now U.S. Pat. No. 6,501,236 B1, the disclosure of which is incorporated by reference.

CROSS REFERENCE TO RELATED APPLICATIONS

Not applicable.

STATEMENT AS TO THE RIGHTS TO INVENTION MADE UNDER FEDERALLY SPONSORED RESEARCH AND DEVELOPMENT

Not applicable.

BACKGROUND OF THE INVENTION

The present invention relates generally to variable switches commonly referred to as "dimmer switches", and more particularly to a dimmer switch with reduced electronic noise.

It is often desirable to adjust the output of a lamp or similar electronic device. Many conventional dimmers use a switching circuit to vary the conduction angle of an alternating current ("AC") signal. Switching circuits often use solid-state semiconductor switching devices such as a triac or a silicon-controlled rectifier ("SCR") to vary the power delivered to the load (e.g. incandescent lamp). However, in AC dimmers the switching devices are typically turned on and off very fast. This sharp transition generates radio frequency interference ("RFI") or "noise". Such noise often interferes with radio reception, and some commercially available AC dimmer switches even warn against using the AC dimmer switch within a certain distance of a radio receiver.

Furthermore, triacs have a turn-on voltage drop, typically about 0.50–0.75 V that can generate significant heat and require a large heat sink for high-power loads. For example, a triac drawing 6 amps will generate about 3–4.5 W of power. The turn-on voltage can also create hysterisis in the turn-on/turn-off behavior of the switch. That is, in order to dim a lamp to nearly off, the triac must first be turned on above its turn-on voltage, and then the dimmer switch operating point can be reduced to the desired low level. Such behavior precludes having the dimmer pre-set to operate at a low level when the dimmer switch is activated, and the light usually snaps on at a relatively high level. The turn-on characteristics of conventional triac- or SCR-based AC dimmers can also cause flickering near the turn-on voltage, as well as a discontinuity ("step") in the brightness of a lamp.

Therefore, it is desirable to provide a dimmer switch with sufficiently low RFI to be used near a radio receiver. It is further desirable that the dimmer switch be efficient and not require excessive heat sinking, and allow a pre-set turn-on low-output operating point.

SUMMARY OF THE INVENTION

A direct-current switch is used in a dimmer switch to provide a low-noise variable switch. A rectifier bridge converts AC line voltage to pulsating DC. The pulsating DC is provided to a load through a series DC switch, in one case the DC switch is a FET with a series resistance less that 0.1 ohms when on. In other embodiments the series resistance is as low as 0.001 ohms. The DC switch is turned on during a pulse signal generated by a comparator. The width (period) of the pulse signal is basically the time a ramp voltage input to the comparator exceeds a set-point voltage input to the comparator. The ramp voltage is generated by an integrator using capacitive feedback. The integrator is re-set at each zero crossing of the line voltage when the pulsating DC voltage drops below a minimum supply voltage of the integrator and the capacitor discharges. The pulse output of the comparator is provided to the input of the FET through a series resistor. The combination of the input capacitance of the FET and the series resistor avoids a sharp turn-on characteristic of the FET, thus reducing the generation of electromagnetic noise.

In a further embodiment, a DC dimmer circuit is combined with a toggle to turn the load on and off at a pre-selected level. The DC dimmer circuit allows essentially full-range control because of the small voltage drop across the DC switch. Thus, the DC dimmer can be turned on at very low pre-set levels. Furthermore, because of the low power dissipation in the DC switch, relatively little heat sinking is required.

In a further embodiment, a DC dimmer switch is combined with a radio receiver into a radio receiver product. The DC dimmer switch is essentially noiseless. A detector, such as a passive infrared detector, may be further combined with the toggle to turn the load on and off at a pre-selected level upon a signal from the detector, such as when a person walks into a room or waves a hand in front of the detector.

BRIEF DESCRIPTION OF THE DRAWINGS

FIG. 5A is a simplified representation of an oscilloscope display showing the ramp voltage, the comparator voltage, and the drive voltage when the drive is fully on.

FIG. 5B is a simplified representation of an oscilloscope display showing the ramp voltage, the comparator voltage, and the drive voltage when the drive is about half on.

DESCRIPTION OF THE PREFERRED EMBODIMENTS

I. Introduction

The present invention provides an essentially noiseless direct-current ("DC") dimmer switch with low power dissipation in the switch. An AC line voltage is converted to a series of single-sided pulses. An integrator generates a series of ramp voltages that are compared against a set-point voltage to produce a series of DC pulses. Each DC pulse turns on a DC switch, such as a field effect transistor ("FET"). A FET can have very low resistance between the drain and source, between about 0.1–0.001 ohms, when turned on, thus resulting in very low power dissipation in the switch. For example, if the switch is handling 6 amps, only between about 0.06–0.006 W of power will be generated, compared to the 3–4.5 W that might be generated in a triac. The gate capacitance of the FET moderates the pulse edges to provide smooth turn-on and turn-off of the switch, thus suppressing RFI to imperceptible levels. In one embodiment, the dimmer switch is combined with a radio receiver.

II. An Exemplary Dimmer Circuit

Figure 1A:
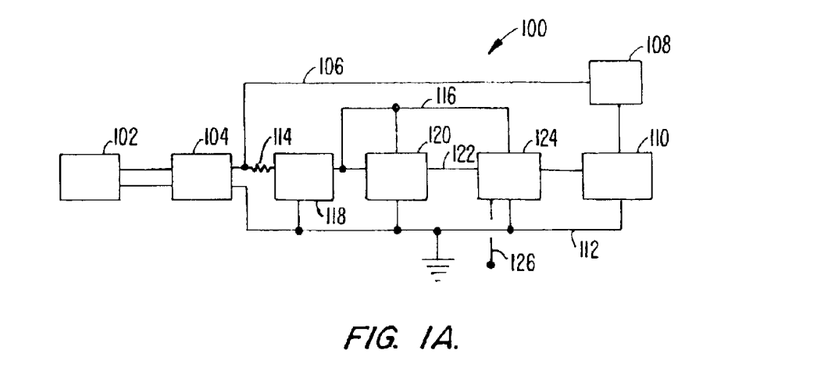
FIG. 1A is a simplified block diagram of a variable direct-current switch according to an embodiment of the present invention.

FIG. 1A is a block diagram of a dimmer switch 100 according to an embodiment of the present invention. Line voltage is supplied by an AC source 102, such as a 115 V 60 Hz wall outlet. Those skilled in the art will appreciate that the voltage and frequency are exemplary only, and that other voltages, such as 100 V or 230 V, and other frequencies, such as 50 Hz, among others, could be provided. A ridge rectifier 104 converts the AC to unregulated pulsating DC 106. One side of the unregulated pulsating DC is supplied to a load 108, such as an incandescent lamp or other resistive load, through a DC switch 110, to the other side 112 of the bridge rectifier. This side 112 of the rectifier will be used as the reference voltage, or ground, for purposes of discussion. A current-limiting resistor 114 is placed between the unregulated DC side 106 of the bridge rectifier and the regulated DC side 116.

A voltage limiter 118, such as a Zener diode, limits the voltage across it to create a pulsating DC voltage with a maximum voltage of about 12 volts and a minimum voltage of about 0 volts, the lower voltage occurring at each zero crossing of the line voltage, which occurs at twice the AC source frequency, or 120 Hz. An integrator 120 is powered by the regulated DC voltage; however, when the regulated DC voltage drops below a minimum bias voltage (e.g. $V_{CC}$) required for operation of the integrator, the integrator turns off. Thus, as the line voltage approaches a zero crossing, the integrator shuts off and stays off for a period of time until the supply voltage rises sufficiently to turn the integrator back on. In a particular embodiment, the voltage limiter is a 12 V Zener diode that limits the maximum voltage supplied to other control circuitry, such as the integrator, which can incorporate an operational amplifier ("op-amp") or similar device, such as an LM 341™ available from NATIONAL SEMICONDUCTOR of Santa Clara, Calif., which has a minimum $V_{CC}$ of about 1 V. Other op-amps could be used and the minimum $V_{CC}$ can be as low as about 0.1 V. Thus the integrator is controlled through the power supply voltage, rather than the input voltage to the integrator.

When the integrator 120 comes back on as the DC pulse voltage rises, the integrator creates a positive-going ramp (see FIG. 1C) at twice the line frequency. The ramp stops at each zero crossing as the regulated pulsating DC voltage 116 to the integrator goes to approximately ground. The output 122 of the integrator, i.e. the ramp, is provided to a comparator 124. The comparator compares a set-point voltage 126 against the instantaneous ramp voltage. If the ramp voltage is essentially equal to or greater than the set-point voltage, the comparator provides a "switch-on" signal. The set-point voltage could be provided by a variable resistive voltage divider, a microprocessor output, a digital-to-analog converter, a timed voltage signal, or another ramped voltage, for example.

The switch-on signal is provided to the DC switch 110 and closes the switch, i.e. allows current to flow through the switch and hence the load 108. In the absence of a switch-on signal, the switch is open and essentially no current flows through the load. In a particular embodiment, the switch is a FET, and the switch on signal is a voltage above the turn-on voltage of the FET, which turns on the FET with a series resistance of about 0.01 ohms. Thus, essentially the full rectified DC voltage is provided to the load (minus incidental voltage drops, such as a voltage drop through the DC switch 110, which can depend on the load resistance and the available current) when the switch is fully on. The full DC voltage is provided to the load as long as the switch-on signal is provided to the DC switch; however, in order to avoid RFI, the DC switch is turned on gradually. The FET is preferably selected to have a low resistance between the drain and source when the FET is on. In one embodiment, the resistance is less than about 0.1 ohms, in another embodiment, the resistance is less than about 0.01 ohms, and in yet another embodiment, the resistance is less than about 0.001 ohms. Those skilled in the art will appreciate that the FET may be selected according to many criteria, including the anticipated power delivered to the load, anticipated ambient temperature, and available heat-sinking for the FET, among others.

The DC switch has a selected input capacitance that slows the transition from off to on in the switch. Thus the DC switch turns on gradually and avoids the generation of RFI associated with fast-on/fast-off devices, such as conventional AC switch devices. The length of time the DC switch is on is generally the duration of the pulse ("pulse width") out of the comparator 124. Therefore, one way to consider the operation of the circuit is that pulse-width modulation of a switch-on signal is used to vary the time a DC voltage is available to a load. The circuit further provides essentially the entire unregulated pulsating voltage across the load.

Figure 1B:
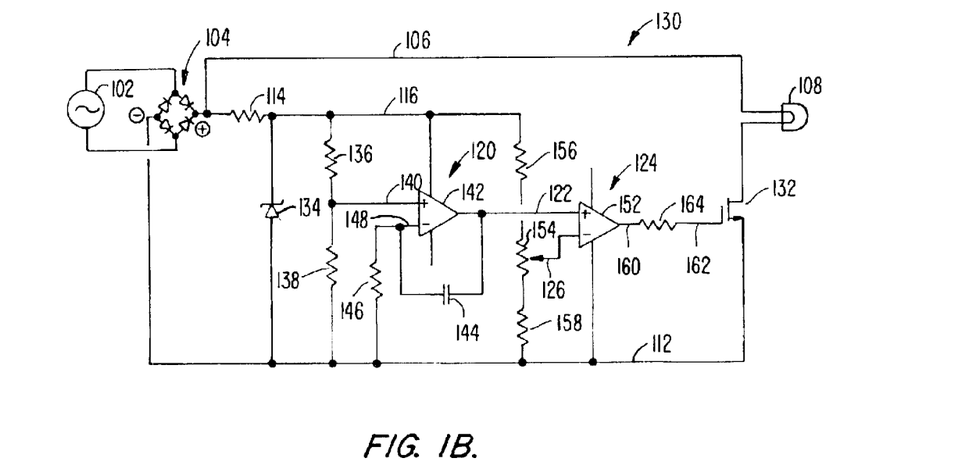
FIG. 1B is a schematic diagram of an example of the variable direct-current switch according to FIG. 1A.

FIG. 1B is a schematic of a circuit 130 according to an embodiment of the present invention. A four-diode bridge rectifier 104 provides unregulated pulsating DC to the load 108 through the DC switch that is a FET 132 and to a Zener diode 134 through the current-limiting resistor 114. Each of the diodes in the rectifier bridge are rated for 200 V, 2A operation (for a 200 W load), but other diodes could be used, depending on the intended application, particularly the power requirements of the load. The Zener diode has a reverse-bias breakdown of nominally 12 V and can handle at least 5 mA of current, which is the approximate current limit set by the current-limiting resistor (24 kohm, ½ W) 114 in conjunction with other current paths in the circuit, and is sufficient for the loads of the control circuitry on the regulated voltage.

A voltage divider made up of two resistors 136, 138 (82 kohm and 18 kohm respectively) provides about ⅕ of the regulated DC voltage to the positive input 140 of the first op-amp 142. An integrating capacitor 144 is charged through a current-source resistor 146 when the voltage at the positive input 140 of the first op-amp is higher than the negative input 148 of the first op-amp. The integrating capacitor 144 is a non-polarized 0.015 micro-Farad capacitor, and the current-source resistor 146 is 150 kohms. When the regulated DC voltage drops below the minimum turn-on voltage (i.e. Vcc) of the first op-amp (i.e. at a zero crossing), the integrating capacitor discharges, thus re-setting the integrator for the next positive input signal.

Thus, the voltage at the output 122 of the first op-amp is a ramp (see FIG. 1D), and is provided to the positive input of the second op-amp 152, which acts in conjunction with associated circuit components as a comparator and pulse generator. A set-point voltage 126 is provided to the negative input of the second op-amp 152, in this case by a resistive voltage divider that includes a variable resistor 154. The voltage divider includes two other resistors 156, 158. The variable resistor is nominally 0–500 kohms, the first resistor 156 is 75 kohms and the second resistor 158 is 220 kohms. The first and second op-amps can be incorporated in a single dual or quad (only two of which are used for the dimmer) packaged op-amp device, such as a model number LMC 6022™ available from NATIONAL SEMICONDUCTOR of Santa Clara, Calif.

When the ramp voltage is above the set-point voltage, the output 160 of the second op-amp rises. This rise is very fast and is essentially equal to the bias voltage ("rail") of the op-amp. However, the voltage rise at the gate 162 of the FET DC switch 132 is slowed by the combination of the output series resistor 164 (15 kohms) and the gate capacitance (not shown) of the FET. The FET could be a model IFR 630™, available from MOTOROLA, INC. in Austin, Tex. for example, or a similar device. In particular, a bipolar device could be used with appropriate bias circuitry (e.g. more current through the bias resistor 114). A discrete capacitor could also be added between the gate and ground if the gate capacitance of the FET is not sufficient to suppress RFI generated when the DC turns on. Thus, the FET is an efficient DC switch that requires only minor heat sinking.

A circuit according to FIG. 1B was built and tested for noise generation. The circuit was assembled with standard AM radio receiver in the device housing, thus the dimmer circuit was within about 0.3 m (1 foot) of the radio receiver, and the dimmer circuit was used to drive an incandescent lamp. The radio was tuned to a quiet portion of the AM band, and the dimmer switch circuit was activated (115 V AC was supplied). There was no discernable change in the sound output from the radio with the dimmer switch on or off.

Next, a fast Fourier transform ("FFT") analyzer with an antenna was used to measure the noise produced by the dimmer switch. The circuit produced less than −90 dBm of noise below 10 kHz.

The dimmer switch can be used in a variety of applications, such as a lamp dimmer inside of a radio receiver, a plug-in lamp dimmer, and a wall dimmer. It can be adapted to run on a variety of AC line voltages and frequencies, and provide variable control to a variety of loads, depending on the ratings of the circuit components, primarily the diodes in the rectifier bridge and the DC switch device. Furthermore, this dimmer can replace standard wall dimmers for incandescent lighting if both terminals of the AC line and both terminals to the load are available for connecting to the dimmer switch.

III. Representative Waveforms

Figure 1C:
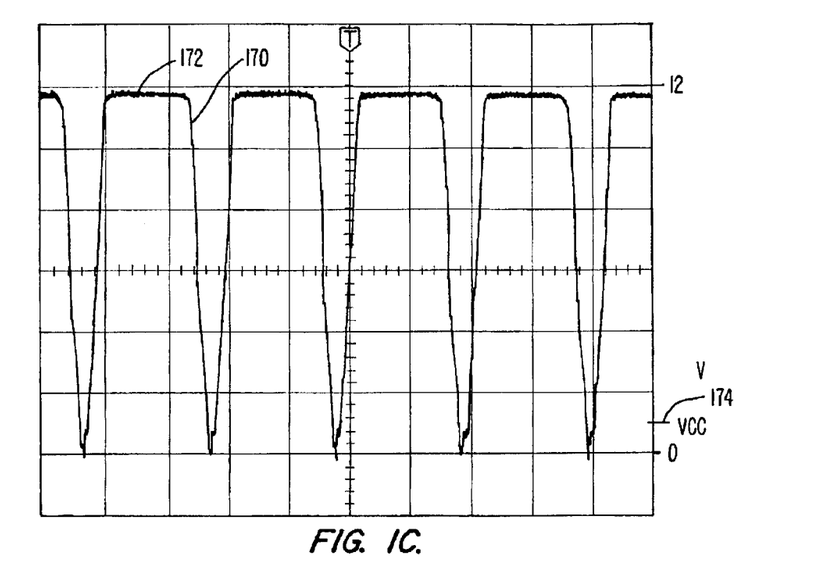
FIG. 1C is a simplified representation of an oscilloscope display showing voltage versus time at the output of the pulse converter.

FIGS. 1C–1F are simplified graphs of waveforms at various points of the dimmer circuit illustrated in FIG. 1B. FIG. 1C is a simplified graph of the regulated pulsating DC voltage 170 versus time across the Zener diode (FIG. 1B, ref. num. 134). Note that the Zener diode clamps the maximum voltage 172 at about 12 V, and that the voltage dips below $V_{CC}$ 174 of the integrator. The op-amp of the integrator is essentially unpowered during the periods that the regualated DC voltage is below Vcc.

Figure 1D:
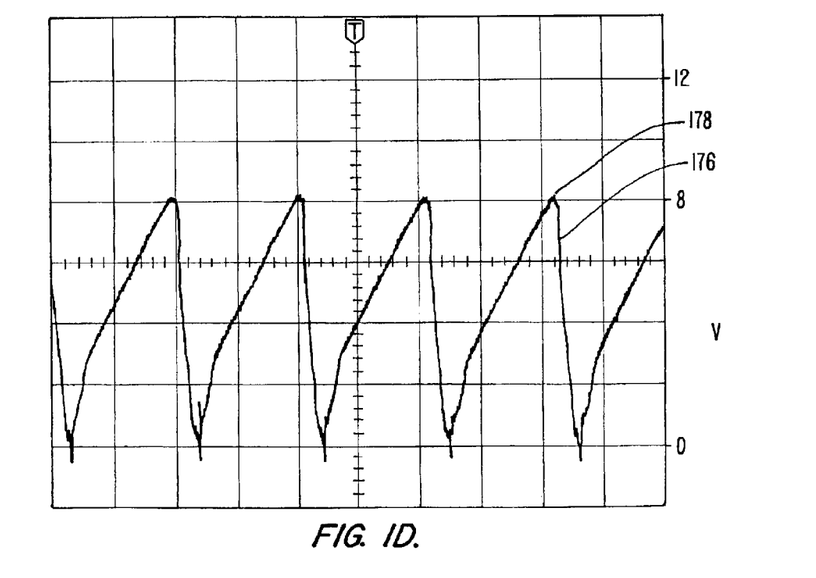
FIG. 1D is a simplified representation of an oscilloscope display showing the ramp voltage out of the integrator.

FIG. 1D is a simplified representation of an oscilloscope display showing the voltage 176 versus time at the output of the integrator (see FIG. 1B, ref. nums. 120 and 122). The maximum voltage 178 of the ramp is less than the maximum regulated DC voltage; however, those skilled in the art will appreciate that there are many variables and choices available to create a ramp that allows the desired range of control of the load, including, for example, the RC time constant of the integrator and the voltage range of the set-point. Each ramp cycle stops at essentially a zero crossing 180 of the line voltage.

Figure 1E:
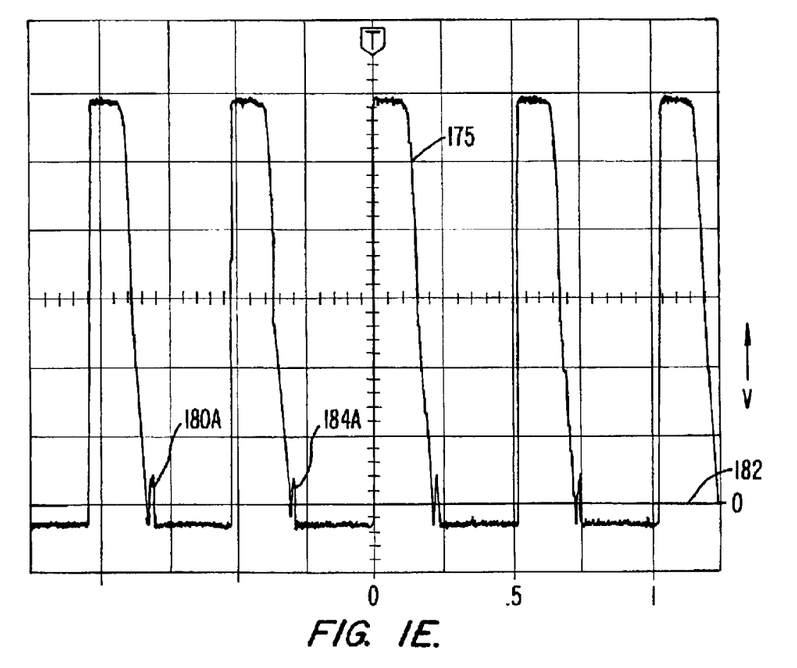
FIG. 1E is a simplified representation of an oscilloscope display showing the output of the pulse generator at a low power level.
Figure 1F:
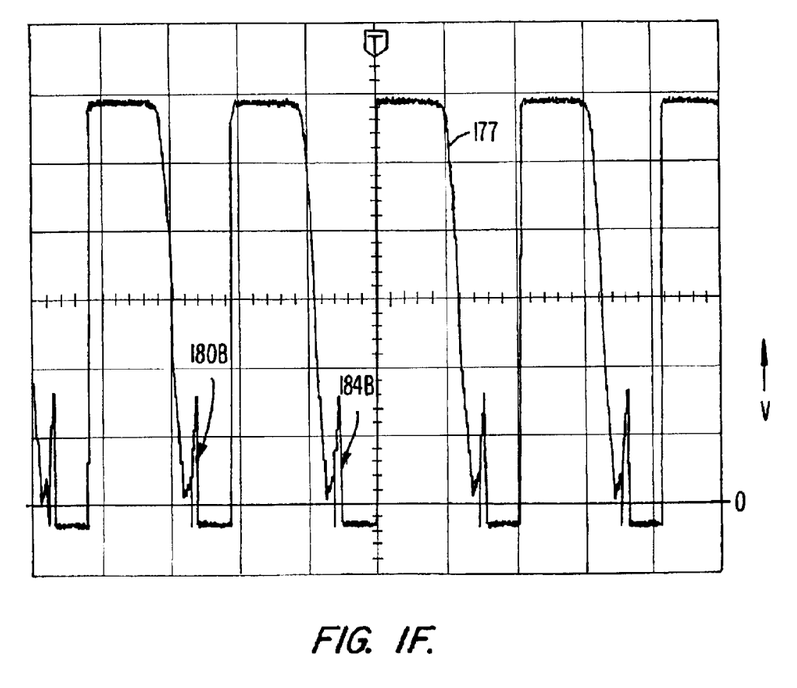
FIG. 1F is a simplified representation of an oscilloscope display showing the output of the pulse generator at a high power level.

FIG. 1E is a simplified representation of an oscilloscope display showing the output 175 of the comparator/pulse generator (see FIG. 1B, ref. nums. 124, 160) when a relatively low power is supplied to the load. The x-axis 182 indicates a time scale showing zero crossings 180A, 184A at twice the line frequency (e.g. 120 Hz). The duration of each of the pulses is set by controlling the set-point voltage to the comparator/pulse generator. For example, the center tap of the variable resistor (see FIG. 1B, ref. num. 154) is set to a value to provide a relatively high resistance between the center tap and ground, thus the set-point voltage is relatively high because most of the voltage drop from the regulated DC line to ground occurs between the center tap and ground. This causes the comparator/pulse generator to provide a low output that does not turn on the DC switch until the ramp voltage exceeds the set-point voltage, which occurs for a relatively short portion of the time between zero crossings. In comparison, FIG. 1F is a simplified graph of the output 177 of the comparator/pulse generator when the center tap of the variable resistor is set to a value to provide a relatively low resistance between the center tap and ground. In this instance, the set-point voltage is relatively low and the DC switch is turned on for most of the time between zero crossings 180B, 184B.

IV. A Process for Generating a Voltage Ramp

Figure 1G:
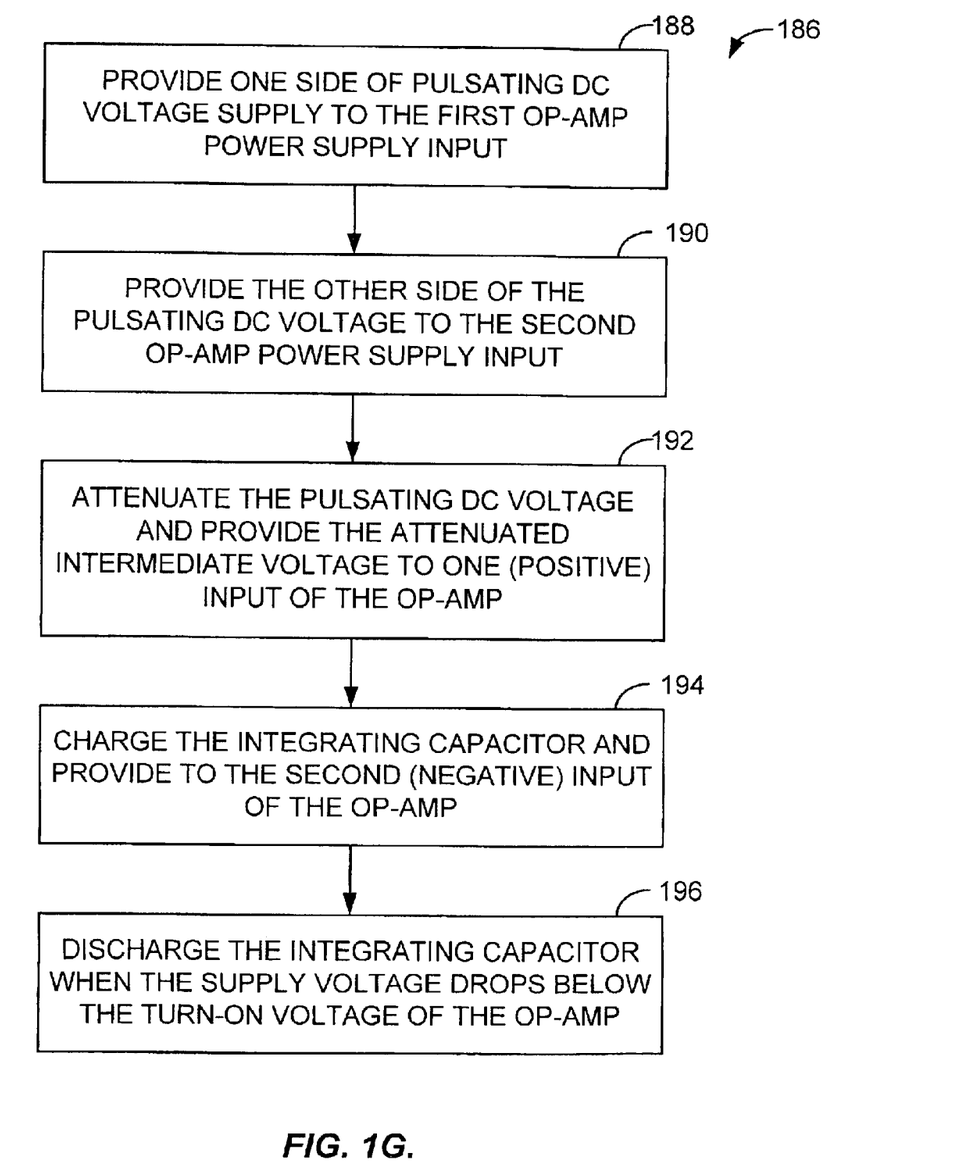
FIG. 1G is a simplified flow chart of a process for generating a voltage ramp according to an embodiment of the present invention.

FIG. 1G is a simplified flow chart of a process for generating a voltage ramp 186 according to an embodiment of the present invention. A pulsating DC voltage is supplied across the power supply inputs of an operational amplifier (steps 188, 190). The pulsating DC voltage is attenuated by a voltage divider and provided to one of the inputs of the operational amplifier (step 192). An integrating capacitor between the operational amplifier output and another input of the operational amplifier is charged through a charging resistor (step 194) as long as the pulsating DC voltage across the power supply inputs is above a turn-on voltage of the operational amplifier. The integrating capacitor discharges (step 196) when the pulsating DC voltage is below the turn-on voltage of the operational amplifier, thus resetting the ramp voltage.

V. Pre-set Dimmer Switch Level

Figure 2A:
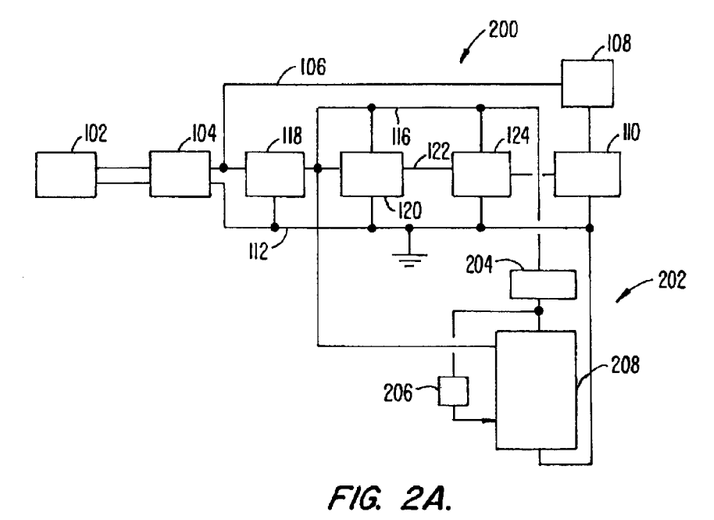
FIG. 2A is a simplified block diagram of a variable direct-current switch with an on/off toggle according to a further embodiment of the present invention.
Figure 2B:
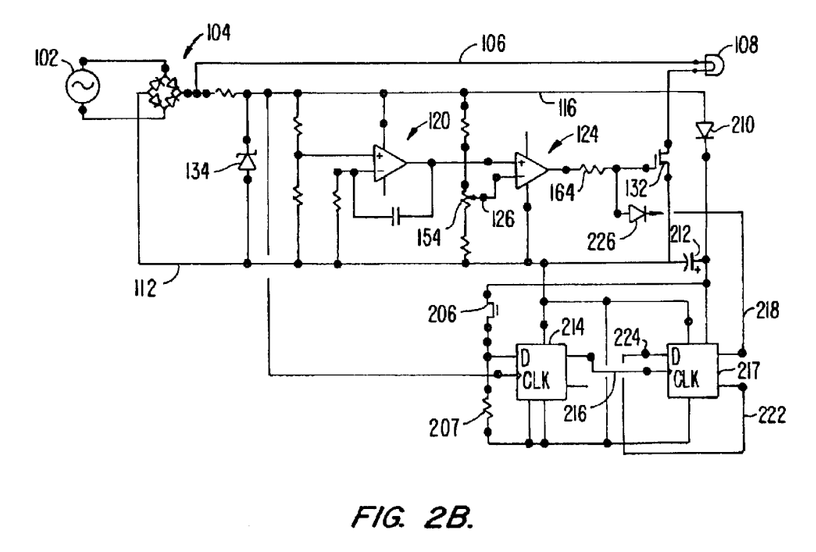
FIG. 2B is a schematic diagram of an example of the switch of FIG. 2A.

FIG. 2A is a simplified block diagram of a variable DC switch 200 with an on/off toggle button 202 according to another embodiment of the present invention. A filter 204 has been added to provide a more constant DC voltage to the toggle. The toggle includes a mechanical button 206 and circuitry 208 to avoid "bouncing" of the toggle. FIG. 2B is a schematic diagram of an example of the switch shown in FIG. 2A. The mechanical switch 206 is a single-button or toggle on/off switch for use inside a radio, with a plug-in lamp dimmer, or other application, connected to ground through a 1 M-ohm resistor 207. Filtering of the pulsating DC is accomplished using a diode 210 in conjunction with a capacitor 212 of about 10 micro-Farads.

A first logic unit 214 operates as a de-bounce circuit for the mechanical switch 206. When the switch is pushed or flipped, the output 216 of the first logic unit switches on the next clock signal (the regulated pulsating DC), which occurs about every 8.3 ms. The output of the first logic unit is then provided as the clock signal to a second logic unit 217. The output 218 of the second logic unit toggles up and down according to a feedback signal 222 provided to the "D" input 224 of the second logic unit.

When the output 218 of the second logic unit 217 is high, a diode 226 between the output of the second logic unit and the DC switch 132 approximates an open circuit, essentially isolating the DC switch from the toggle. When the output of the second logic unit is low, the diode 226 approximates a short circuit grounding the input to the DC switch, thus turning the dimmer switch off. The toggle allows the load controlled by the dimmer switch to be activated at a preset level, namely according to the level of the set-point voltage, provided in this instance by the center tap 126 of the variable resistor 154. One way to consider the operation of this type of toggle is that the dimmer level control circuitry is always on, but that the DC switch, and hence the load, is not enabled unless the toggle allows the control signal to turn on the DC switch. The first and second logic units are provided in an integrated circuit, such as a model number MC14013™ available from MOTOROLA, INC. Other circuits, including other integrated circuits, could be used.

Figure 3A:
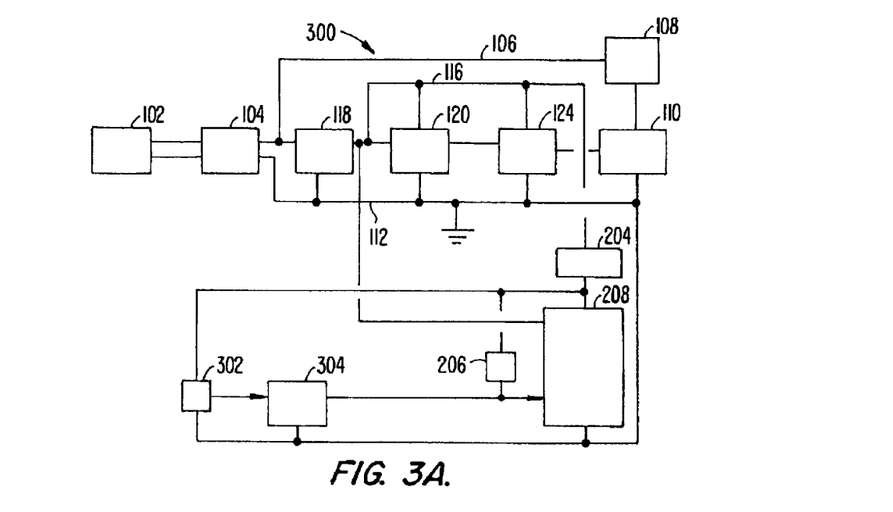
FIG. 3A is a simplified block diagram of a variable direct-current switch with a motion detector according to yet another embodiment of the present invention.

FIG. 3A is a simplified block diagram of a variable DC switch 300 with a motion detector according to another embodiment of the present invention. A detector 302, such as a passive infra-red ("PIR") detector, is used to turn the load 108 off and on at a preset level by waving a hand across the detector, for example, or when a person enters a room. In one embodiment, the detector is a dual element PIR. The detector could be placed on a radio or a lamp, for example. The PIR operates in conjunction with a detector circuit 304 to operate the toggle in lieu of or in conjunction with the toggle switch described above in relation to FIGS. 2A and 2B. In one embodiment, the detector may be switched out by turning the mechanical switch off. In another embodiment, the mechanical switch is omitted. In yet another embodiment, the detector operates to turn on the load via the dimmer switch regardless of the state of the mechanical switch.

Figure 3B:
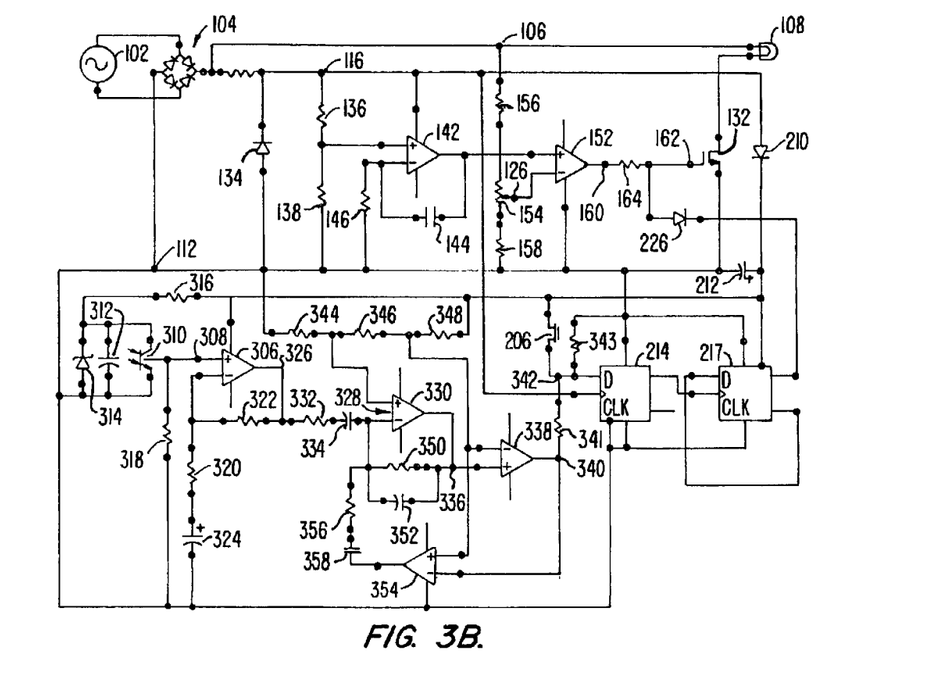
FIG. 3B is a schematic diagram of an example of the switch of FIG. 3A.

FIG. 3B is a schematic diagram of an example of the switch of FIG. 3A. A first op-amp 306 amplifies the low-frequency output 308 of the PIR 310. The PIR power is decoupled with a 100 micro-farad capacitor 312 and a 5 V Zener diode 314 off the regulated pulse DC 116. Resistors 316, 318, 320, 322, for the PIR and first op-amp are 51 k-ohms, 100 k-ohms, 10 k-ohms, and 1 M-ohm, respectively. A DC block capacitor 324 of 22 micro-farads is placed in series with the gain set resistor 320 and ground 112.

The output of the first op-amp is coupled to a summing junction 328 of a second op-amp 330 through a series resistor 332 and coupling capacitor 334. The resistor 332 is 10 k-ohms and the coupling capacitor 334 is 22 micro-farads. The output 336 of the second op-amp 330 is used to drive a comparator 338 (implemented with a quad op-amp, such as an LP324™ available from NATIONAL SEMICONDUCTOR). During the positive portion of the PIR detector signal, the comparator provides a signal 340 to the input 342 of the first logic unit 214 through a 100 k-ohm resistor 341 to toggle the dimmer switch on and off when the mechanical button 206 is open. A 1 M-ohm resistor 343 connects the "D" input of the first logic unit to ground.

The operation of second op-amp 330 is set according to bias resistors 344, 346, 348 of 1 M-ohm, 220 k-ohm, and 1 M-ohm, respectively. The summing junction 328 is coupled to the output 336 of the second op-amp through a feedback resistor 350 of 1 M-ohm and a feedback capacitor 352 of 0.1 micro-farad. An inverter 354 drives the summing junction of the second op-amp through a series resistor 356 of 10 k-ohms and capacitor 358 of 0.47 micro-farads. The capacitor 358 is a non-polarized capacitor, preferably a ceramic capacitor. The negative-going signal from the inverter 354 drives the second op-amp 330 into positive saturation and keeps the output of the second op-amp high for about 1 second until the capacitor 358 is charged through the series resistors 356 and 350.

This approximately 1-second positive signal from the output 336 of the second op-amp gives a clean gate to enable the first logic unit 214. The PIR is disabled during this period, i.e. the circuit will not recognize additional positive detector output for about 1 second. After about 1 second, the capacitor 358 is charged through the resistors 350, 356 and the output of the second op-amp comes down from saturation. This flips the output of the comparator 338 down and the output of the inverter 354 up.

The positive-going output from the inverter 354 again drives the summing junction of the second op-amp 330 through the capacitor 358 and the series resistor 356, and causes the output of the second op-amp to saturate at ground. The output of the second op-amp stays at ground for about 1 second before the capacitor 358 is discharged. During this period, an output signal from the PIR does not affect operation.

The combination of the first, positive, time period and the second, negative, time period keeps the PIR from having an effect on the detector circuitry for about 2 seconds after motion is first detected. Thus, detecting additional motion within these 2 seconds will not inadvertently turn off the load.

Although summing junctions are typically low-impedance (when not in saturation), the operation of the second op-amp provides a relatively high impedance (through the resistors 350, 356) during the detection cycle. Furthermore, the second op-amp provides many functions. It is, in conjunction with its bias and feedback circuitry, an amplifier, a bandwidth limiter, a timing/debounce generator (using the 1-second positive signal), and a detection lock-out generator (from the 1-second positive and 1-second negative signals). To achieve this, the output of the second op-amp ranges from a maximum to a minimum output.

VI. Radio With Dimmer Switch

Figure 4:
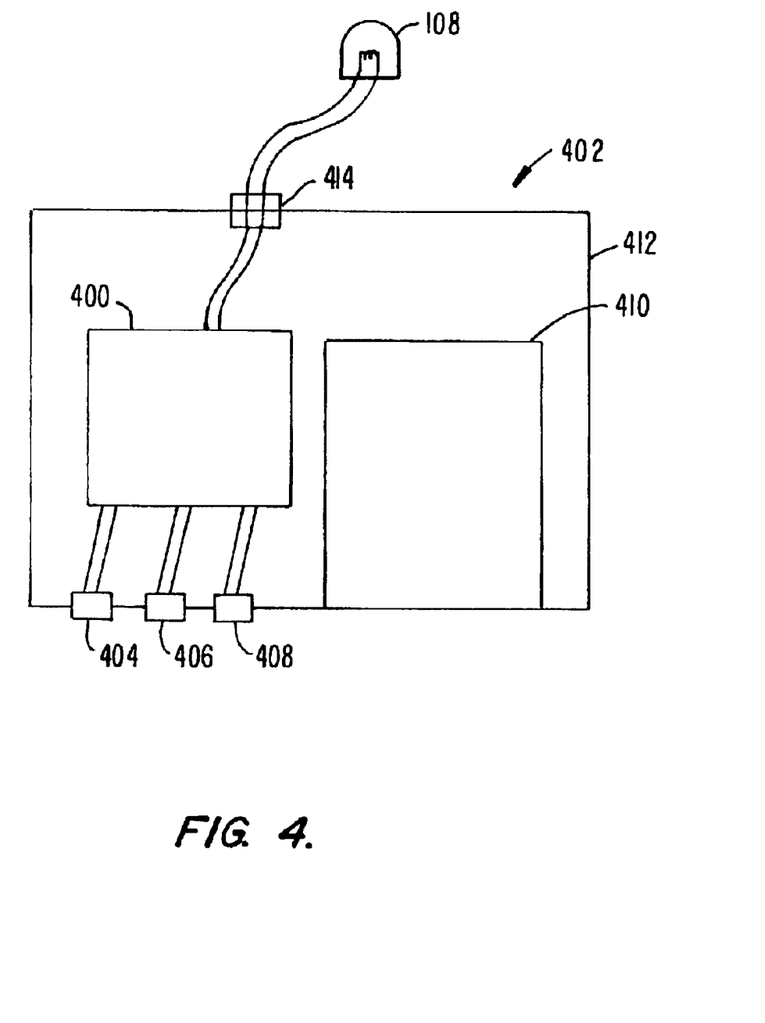
FIG. 4 is a simplified diagram of a DC dimmer switch in combination with a radio receiver, according to another embodiment of the present invention.

FIG. 4 is a simplified diagram of a DC dimmer switch incorporated with a consumer radio receiver product 402 according to another embodiment of the present invention. The DC dimmer switch 400 includes a set-point input 404, such as a variable resistor providing a selected voltage, and can optionally include a toggle button 406 and/or a detector 408, such as a PIR. The radio receiver product further includes a radio receiver 410 in close proximity to the DC dimmer switch, typically within a common housing 412 that has a maximum dimension less than about 0.3 m. An outlet plug 414 is provided to connect a resistive load 108, such as an incandescent lamp, to the radio receiver product. Alternatively, a lamp or other DC load could be incorporated into the radio receiver product. The DC dimmer could be activated whenever the radio is on, or a separate switch could be provided, such as the toggle switch and circuit as discussed above in reference to FIGS. 2A and 2B, or a separate line switch, such as in series on a leg of the input to the rectifier bridge, could be provided.

The low-noise characteristics of the DC dimmer switch allow it to be used in close proximity to a radio receiver without discernable noise being heard on the radio output. Low noise is achieved by gradually turning on a DC switch component. Alternatively, a DC dimmer switch according to the present invention could be used as a stand-alone dimmer, or installed in a wall or similar application where both power and both load leads are available to connect to the dimmer switch.

VII. Waveforms Illustrating Switch Drive Voltage Operation

Figure 5A:
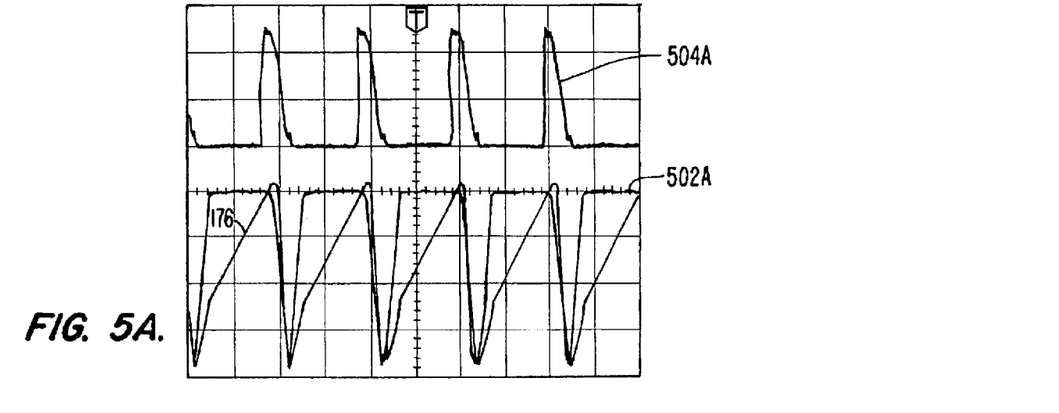
Figure 5B:
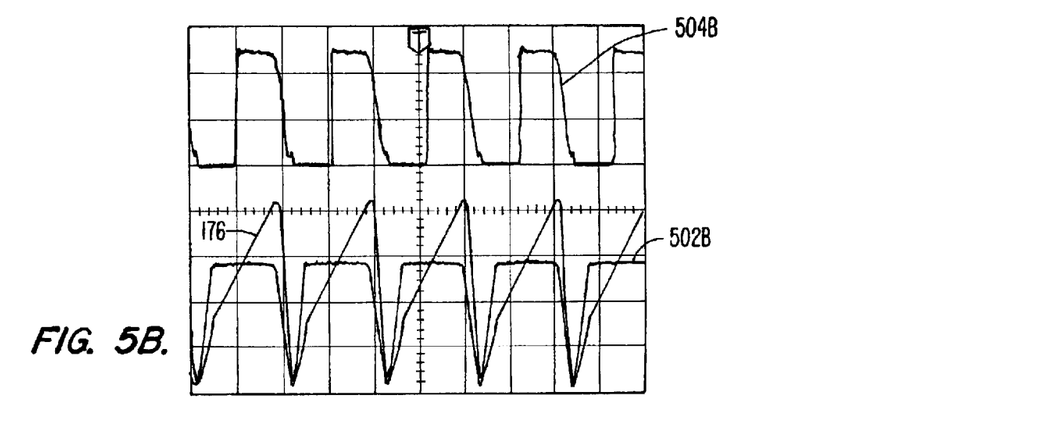
Figure 5C:
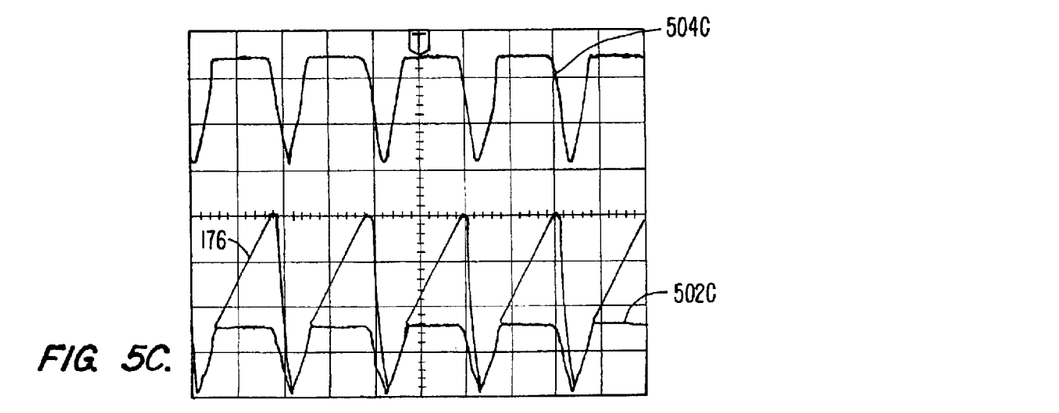
FIG. 5C is a simplified representation of an oscilloscope display showing the ramp voltage, the comparator voltage, and the drive voltage when the drive is nearly off.

FIG. 5A is a simplified representation of an oscilloscope display showing the ramp voltage 176, comparator voltage 502A (see FIG. 1A, ref. num. 126), and the switch drive level 504A at a low level of a dimmer switch built according to an embodiment of the present invention. The width of the pulse of the switch drive level is an approximation of the time that the switch is on, and hence the time power is delivered to the resistive load. Thus, the control function follows the pulsating DC at 120 Hz. FIG. 5B is a simplified representation of an oscilloscope display showing the ramp voltage 176, the comparator voltage 502B, and the switch drive level 504A at an intermediate level when the switch is turned on about half the total period time. FIG. 5C is a simplified representation of an oscilloscope display showing the ramp voltage 176, comparator voltage 502C, and switch drive level 504C when the switch is essentially fully on. Note that the widths (duration) of the drive pulses are roughly equivalent to the time the ramp voltage exceeds the comparator voltage.

VIII. Experimental Results Relating to Noise Contribution

A DC dimmer switch was built according to an embodiment of the present invention and was tested against a conventional dimmer switch for noise output. The DC dimmer switch was tested against a conventional dimmer switch that included a radio-frequency-interference ("RFI") filter. A test antenna with a 520 micro-henry choke was used to couple to the radiated emissions from the dimmer switches. The antenna was located approximately 0.3 m (1 foot) from the conventional dimmer switch and approximately 13 mm (0.5 inches) from the FET of the DC dimmer switch according to the present invention. Thus, there was a factor of about 24× in distance between the antenna and each of the two test devices. One device was turned on and measured. Then that device was turned off, and the other device was turned on and measured. The antenna was not moved during the tests. The antenna was located further away from the conventional dimmer switch because the 60 Hz switching signal would otherwise overload the test set. A TEKTRONIX Model TDS3014™ equipped with a fast Fourier transform was used to convert the voltages measured with the antenna into the frequency domain.

Figure 6A:
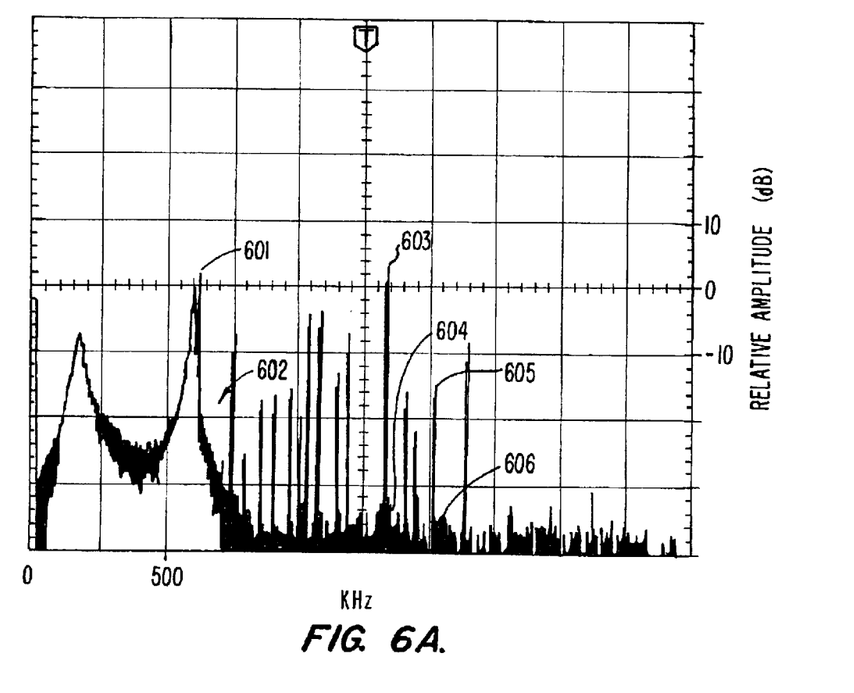
FIG. 6A is a simplified representation of an oscilloscope display in the frequency domain showing emissions within a radio band from a conventional dimmer switch.

FIG. 6A is a simplified representation of an oscilloscope display of the noise spectrum of a conventional dimmer switch and the background signals. A standard LUTRON dimmer switch with RFI filter was used as a test sample. The y-axis is relative amplitude in dB, with each division representing 10 dB. The tall, narrow spikes 601, 603, 605 are AM radio stations that the antenna is picking up. However, the low end of the band shows considerable noise 602 from the device in the AM band, which begins at about 620 kHz. Similarly, noise sidebands 604, 606 are also present on some of the higher-frequency AM signals. Actual noise interference in a combined radio-dimmer switch device is expected to be much higher because the radio antenna would generally be placed much closer than the test antenna and would couple more radiated noise.

Figure 6B:
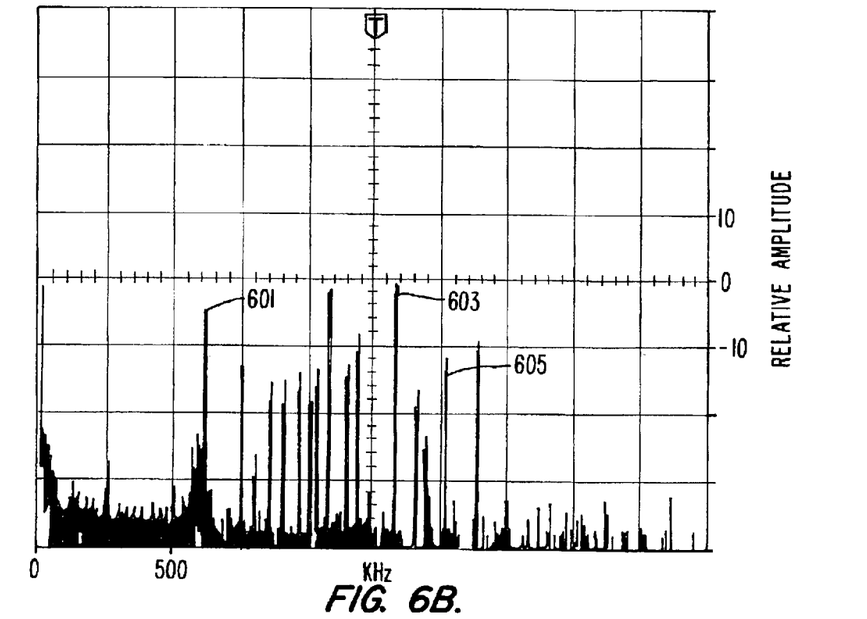
FIG. 6B is a simplified representation of an oscilloscope display in the frequency domain showing emissions within the radio band from a dimmer switch according to an embodiment of the present invention.

FIG. 6B is a simplified representation of an oscilloscope display of the noise spectrum of a DC dimmer switch according to an embodiment of the present invention, and background signals. Note that the low-end noise shown in FIG. 6A is gone. Similarly, noise sidebands clearly present in FIG. 6A on some of the higher-frequency AM signals are also gone. Furthermore, in an actual radio-dimmer switch device, the radio antenna would probably be placed further than 13 mm away from the switching device, thus lowering the actual noise picked up by the antenna.

Figure 6C:
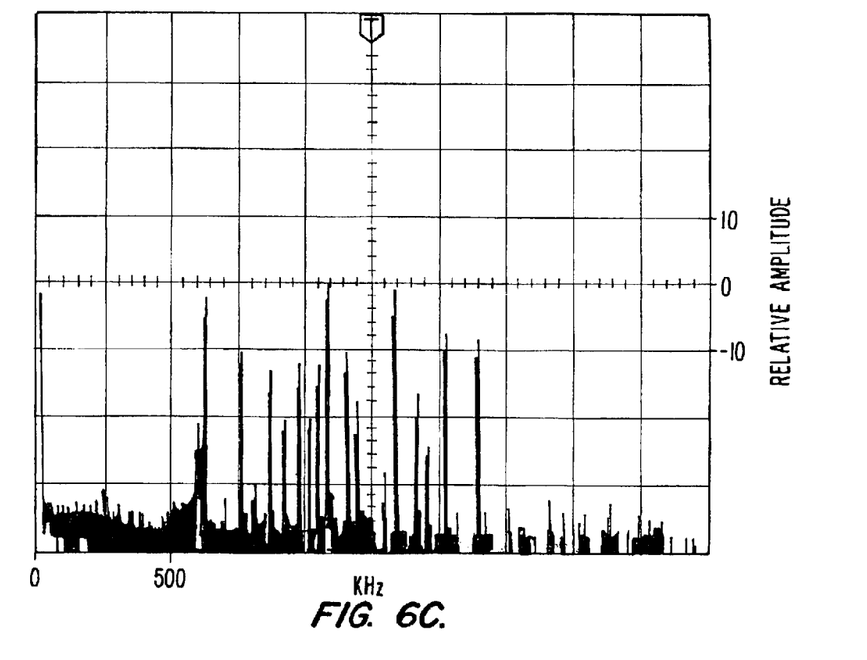
FIG. 6C is a simplified representation of an oscilloscope display in the frequency domain showing the noise spectrum of the test environment.

FIG. 6C is a simplified representation of an oscilloscope display of the test environment background for the test results shown in FIGS. 6A and 6B, above.

Although the present invention has been described with reference to specific embodiments, modification and variation can be made without departing from the subject of the invention as defined in the following claims. For example, a sound detector or vibration detector might be used instead of a PIR, thus allowing operation of the dimmer switch by clapping or tapping the radio, for example. Further, the load, although described in specific embodiments as a light, could be some other type of DC device, such as a radiant heater or an alarm that emits a short burst of sound. Similarly, although specific circuits with specific values of components have been described, other circuits, component values, and types of devices could be used.

I claim:

1. A radio receiver product comprising:
   a direct-current dimmer switch having,
      a direct-current switch,
      an integrator,
      a pulse generator,
      a set-point control,
      a toggle switch, and
      a detector; and
   a radio receiver, the radio receiver and the direct-current dimmer switch being incorporated within a housing, the detector providing a signal to the toggle switch to turn on the direct-current dimmer switch at a pre-set operating point, wherein the integrator is turned off and on at each zero crossing of an alternating line voltage to generate a ramp voltage, the ramp voltage being provided to the pulse generator in conjunction with a set-point voltage to generate a pulse turning on the direct-current switch for essentially a duration of the pulse.

2. An AM radio receiver product comprising:
   a housing;
   a low RFI-producing dimmer switch, incorporated within the housing, comprising:
      an AC dimmer switch input, coupleable to a source of AC;

a rectified DC voltage switch output, coupleable to a load;

means for rectifying an AC input at the switch input and for supplying a rectified DC voltage output to the switch output; and the rectifying means comprising means for turning on the dimmer switch gradually; and an AM radio receiver incorporated within the housing.

3. The radio receiver product of claim 2 further comprising a toggle switch capable of enabling and disabling the dimmer switch, the dimmer switch being enabled at a pro-set control point.

4. The radio receiver product of claim 3 further comprising a detector electrically coupled to the toggle switch, the toggle switch enabling the dimmer switch upon a detector signal.

5. The radio receiver product of claim 2 wherein the dimmer switch gradual turning on means comprises capacitance means for slowing the transition of the dimmer switch from off to on.

6. The radio receiver product of claim 2 wherein the switch input comprises a passive infrared detector.

7. The radio receiver product of claim 2 wherein the switch input comprises a vibration detector.

8. A low RFI-producing dimmer switch comprising:

an AC dimmer switch input, coupleable to a source of AC;

a rectified DC voltage switch output, coupleable to a load;

means for rectifying an AC input at the switch input and for supplying a rectified DC voltage output to the switch output; and the rectifying means comprising means far turning on the dimmer switch gradually.

9. The dimmer switch according to claim 8 wherein the dimmer switch gradual turning on means comprises capacitance means for slowing the transition of the dimmer switch from off to on.

10. The dimmer switch according to claim 8 wherein the switch input comprises a passive infrared detector.

11. The dimmer switch according to claim 8 wherein the switch input comprises a vibration detector.

* * * * *